United States Patent
Zourzouvillys et al.

(10) Patent No.: US 8,447,021 B2
(45) Date of Patent: May 21, 2013

(54) HOLD DETECTION AND HANDLING

(75) Inventors: Theo Peter Zourzouvillys, Bicester (GB); Derek MacDonald, Palo Alto, CA (US); Eric Rescorla, Palo Alto, CA (US)

(73) Assignee: Skype, Dublin (IE)

( * ) Notice: Subject to any disclaimer, the term of this patent is extended or adjusted under 35 U.S.C. 154(b) by 531 days.

(21) Appl. No.: 12/727,648

(22) Filed: Mar. 19, 2010

(65) Prior Publication Data

US 2011/0228914 A1    Sep. 22, 2011

(51) Int. Cl.
*H04M 3/42* (2006.01)
(52) U.S. Cl.
USPC .................... 379/201.01; 455/414.1
(58) Field of Classification Search
USPC ........... 379/88.01–88.23, 211.01, 215.01, 379/142.15, 265.02–266.03; 455/419, 560, 455/414.1, 415
See application file for complete search history.

(56) References Cited

U.S. PATENT DOCUMENTS

| | | | |
|---|---|---|---|
| 6,724,872 B1* | 4/2004 | Moore et al. | 379/93.35 |
| 6,738,615 B1* | 5/2004 | Chow et al. | 455/415 |
| 6,950,504 B1* | 9/2005 | Marx et al. | 379/88.19 |
| 7,248,677 B2* | 7/2007 | Randall et al. | 379/93.23 |
| 7,269,415 B2* | 9/2007 | Bostrom et al. | 455/419 |
| 7,286,821 B2* | 10/2007 | Kraft et al. | 455/415 |
| 7,746,996 B1* | 6/2010 | Ruckart | 379/211.01 |
| 8,335,301 B2* | 12/2012 | Laws et al. | 379/93.17 |
| 2002/0025831 A1* | 2/2002 | Kim | 455/554 |
| 2003/0108187 A1* | 6/2003 | Brown et al. | 379/266.03 |
| 2003/0156701 A1* | 8/2003 | Burg et al. | 379/215.01 |
| 2004/0072593 A1* | 4/2004 | Robbins et al. | 455/560 |
| 2004/0177077 A1* | 9/2004 | Steele | 707/100 |
| 2004/0266426 A1* | 12/2004 | Marsh et al. | 455/426.2 |
| 2009/0219927 A1* | 9/2009 | Hartog et al. | 370/355 |

FOREIGN PATENT DOCUMENTS

| | | |
|---|---|---|
| WO | WO 2009/021761 A1 | 2/2009 |
| WO | WO 2009/073035 A1 | 6/2009 |

OTHER PUBLICATIONS

Notification of Transmittal of the International Search Report and the Written Opinion of the International Searching Authority, or the Declaration, dated Jul. 1, 2011, for Application No. PCT/EP2011/054102, consisting of 10 pages.

\* cited by examiner

*Primary Examiner* — Mohammad Islam
(74) *Attorney, Agent, or Firm* — Wolfe-SBMC

(57) ABSTRACT

A communication system comprising: a terminal having: an interface to a network, whereby the terminal can be connected to another party on a communication session; an output for outputting a communication stream received from another party on a communication session; and a source of play-out stream independent of a communication session; and a communication controller for managing a communication session terminated at the terminal, the communication controller being configured to: a) when it detects that the terminal has been placed on hold in a communication session, cause play-out stream from the source of play-out stream to be directed to the output; and b) when it detects that the terminal has been taken off hold in the communication session, cause communication stream from the communication session to be directed to the output.

20 Claims, 3 Drawing Sheets

HOLD DETECTION AND HANDLING

TECHNICAL FIELD

This invention relates to the behaviour of a communication terminal when it is placed on hold or otherwise experiences a change of communication content to non-interactive type.

BACKGROUND

For illustration of the background to the invention, suppose two parties "A" and "B" are engaged in a voice call with each other. Each party has a communication terminal, and the two terminals communicate with each other by means of a network composed of various equipment. Each communication terminal can sense audio from its user and transmit that audio to the other party, and can reproduce audio signals received from the other party.

During the voice call, party A might put party B on hold. In this context, the term "hold" may have a number of connotations, but typically it indicates that party A has set his terminal so as not to send to party B's terminal audio signals picked up from party A. Whilst party B is on hold, party A's terminal might generate a variety of alternative audio outputs to party B.

a) One option is for party A's terminal to transmit no audio signals to party B's terminal, in which case party B's terminal might produce no audio output whilst it is on hold.

b) A second option is for party A's terminal to generate a substitute audio stream and transmit it to party B's terminal in the same way as audio from party A would be transmitted. That substitute audio stream can then be played out by party B's terminal. Typically the substitute audio stream is music, comfort noise, a repeated message reassuring party B that he is on hold, or a series of beeps. Instead of being generated by terminal A, the substitute audio could be generated by a component in the network path between party A's terminal and party B's hardware; conveniently by a PBX (private branch exchange) local to party A.

A disadvantage of option a) is that whilst party B's terminal is reproducing no audio, party B might be concerned that the voice call has actually been disconnected. He might then terminate the call and have to re-establish communications with party A. A disadvantage of option b) is that there is no way for party A to know whether the audio that his terminal is generating is to party B's taste. Party B might dislike music that is being generated by party A's terminal, or might find other forms of substitute audio from party A annoying.

It would be desirable for a system or terminal to be able to improve the experience of a user whose terminal has been placed on hold without the need for cooperation from or adjustment of the rest of the system which resulted in them being placed on hold.

There is therefore a need for an improved mechanism for serving a party who is on hold.

SUMMARY

According to one aspect of the present invention there is provided a communication system comprising: a terminal having: an interface to a network, whereby the terminal can be connected to another party on a communication session; an output for outputting a communication stream received from another party on a communication session; and a source of play-out stream independent of a communication session; and a communication controller for managing a communication session terminated at the terminal, the communication controller being configured to: a) when it detects that the terminal has been placed on hold in a communication session, cause play-out stream from the source of play-out stream to be directed to the output; and b) when it detects that the terminal has been taken off hold in the communication session, cause communication stream from the communication session to be directed to the output.

According to a second aspect of the present invention there is provided a data carrier storing software for execution in a communication system having a terminal comprising an interface to a network, whereby the terminal can be connected to another party on a communication session; an output for outputting a communication stream received from another party on a voice call; and a source of play-out stream independent of a communication session; and a communication controller for managing a communication session terminated at the terminal; the software being configured to cause the communication controller to: a) when it detects that the terminal has been placed on hold in a communication session, direct play-out stream from the source of play-out stream to the output; and b) when it detects that the terminal has been taken off hold in the communication session, direct communication stream from the communication session to the output.

The communication controller may be configured so that when it detects that the terminal has been placed on hold in a communication session it causes play-out stream from the source of play-out stream to be directed to the output and causes communication stream from the communication session not to be directed to the output. Alternatively, the communication controller may be configured so that when it detects that the terminal has been placed on hold in a communication session it causes play-out stream from the source of play-out stream to be directed to the output and also causes communication stream from the communication session to be directed to the output.

The communication controller may be configured so that when it detects that the terminal has been taken off hold in a communication session it causes play-out stream from the source of play-out stream not to be directed to the output and causes communication stream from the communication session to be directed to the output.

The communication stream may be or comprise an audio stream. The play-out stream may be or comprise an audio stream. The output may be an audio output such as a speaker.

The communication stream may be or comprise a video stream. The play-out stream may be or comprise a video stream. The output may be a video output such as a display.

The communication terminal may comprise memory that stores configuration settings for the source of play-out stream. The source of play-out stream may be responsive to the configuration settings such that the content of the stream that is directed from the source of play-out stream to the output when the terminal has been placed on hold in a communication session is dependent on the configuration settings.

The communication terminal may implement a user interface whereby the configuration settings can be set by a user local to the communication terminal.

The terminal can be a dedicated hardware device, or could be embodied by software running on a multi-purpose computing device. The invention can be embodied in an interactive system.

The source of play-out stream may be responsive to the configuration settings in such a way as to decode one or more files specified by the configuration settings so as to form the stream that is directed to the output when the terminal has been placed on hold in a communication session.

The said file or files may be stored in the memory of the communication terminal.

The source of play-out stream may be responsive to the configuration settings in such a way as to retrieve the stream that is directed to the output when the terminal has been placed on hold in a communication session from a location specified by the configuration settings.

The communication controller may be configured to detect that the terminal has been placed on hold in a communication session by virtue of signalling messages associated with that session.

The communication controller may be configured to detect that the terminal has been placed on hold in a communication session by virtue of processing of the communication stream received from the other party on the call.

The communication controller may be configured to detect that the terminal has been placed on hold in a communication session by virtue of audio processing of the communication stream received from the other party on the call.

The communication controller may be configured to detect that the terminal has been placed on hold in a communication session by virtue of input from a user of the terminal.

The communication controller may be configured to detect that the terminal has been placed on hold in a communication session by virtue of input from a user of the terminal designating the current state of the communication stream as being associated with a hold state.

The communication controller may be configured to detect that the terminal has been taken off hold in a communication session by virtue of signalling messages associated with that session.

The communication controller may be configured to detect that the terminal has been taken off hold in a communication session by virtue of processing of the communication stream received from the other party on the session.

The terminal may comprise the communication controller.

The communication session may be a voice call.

The present invention will now be described by way of example with reference to the accompanying drawings.

DETAILED DESCRIPTION

Many modern communication terminals are capable of functions other than simply making and receiving calls. For example, many mobile phones are integrated with music players; and notebook computers, which are capable of a diverse range of functions, can be used for both internet and circuit-switched calls. In one aspect of the present invention, when the user of such a device is in a call and is placed on hold, the device generates audio locally rather than reproducing any audio sent to it by the other party on the call. Instead of generating audio locally, the device could render other content or could generate an audible or visual prompt. A similar prompt could be generated when the device is taken off hold.

Figure 1:
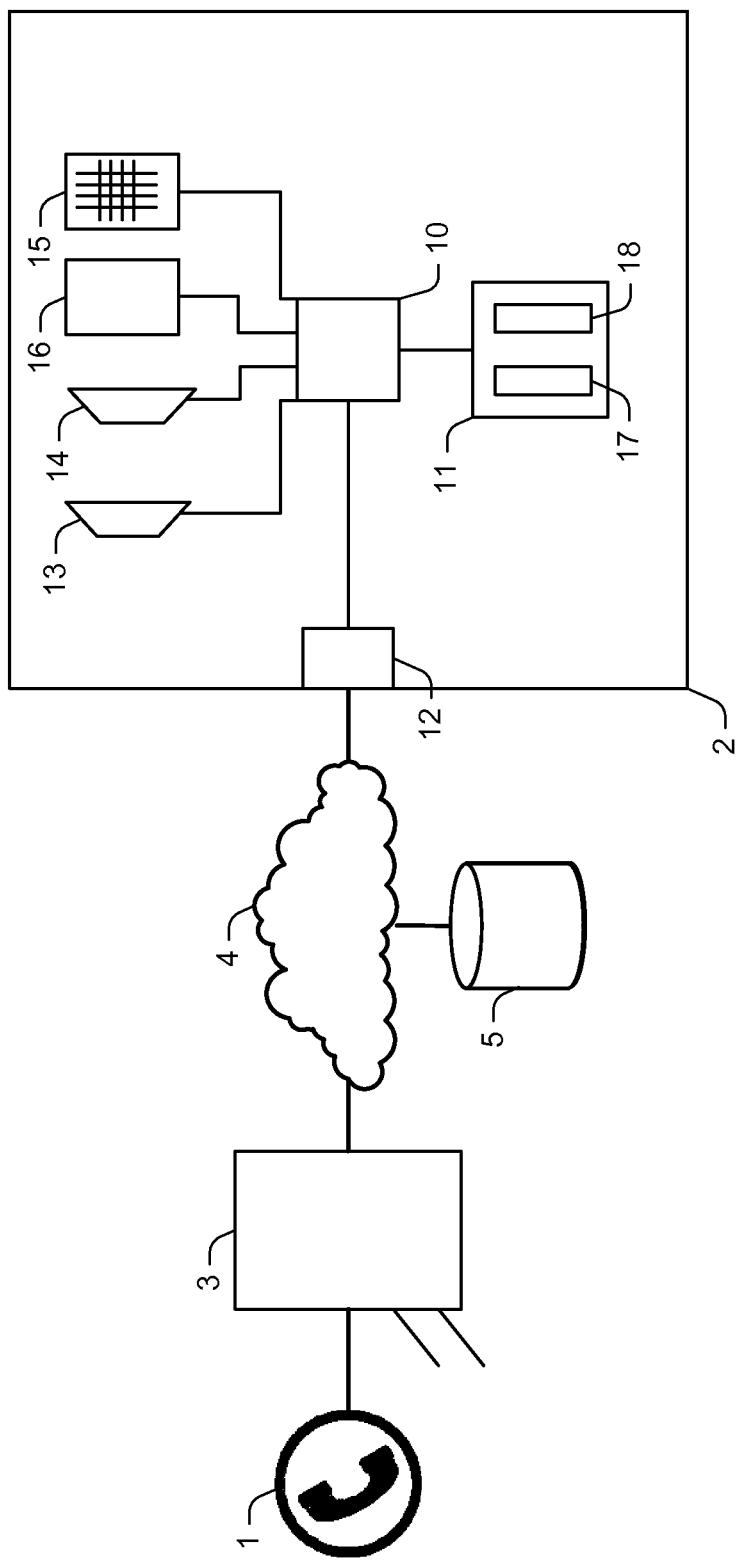
FIG. 1 illustrates schematically a communication environment in which a call is being supported.

FIG. 1 shows a communication environment in which a call is being supported between a terminal 1 of party A and a terminal 2 of a party B. The two terminals could be interconnected by any suitable form of communications path, which could without limitation contain or consist of circuit-switched and/or packet-switched elements. In the present example, terminals 1 and 2 are interconnected by a PBX 3 associated with party A, by network 4, and by the links between elements 1, 3, 4 and 2.

Terminal 2 is a multi-function device. It comprises a processor 10. Coupled to the processor are a memory 11, a communication interface 12, a microphone 13, a loudspeaker 14, a keypad 15 and a display 16. The memory stores software 17 for execution by the processor and also media data 18.

One function that the terminal 2 can perform is to support audio calls with a remote party. To perform this function appropriate code from among the software 17 is executed by the processor to cause the processor to:

a) manage any signalling needed to establish, maintain and terminate the call,
b) receive signals at interface 12 representing audio from the remote party and reproduce that audio at speaker 14, and
c) receive audio from party B by means of microphone 13 and transmit signals representing that audio to party A by means of interface 12.

Another function that the terminal 2 can perform is to play out music or other audio to a user of the terminal. This can be done in various ways. In one option, the music is stored as audio files (e.g. in MP3 format) among the media data 18 in memory 11. The processor executes appropriate code from among the software 17 to retrieve the audio files from memory 11, decode them into audio and pass the audio to loudspeaker 14 for play-out to the user.

The processor 10 is capable of multi-threading or another form of operation in which the state of two processes can be maintained simultaneously. In this way it can support audio calls and music play-out simultaneously, although in practice a user is unlikely to want to hear competing audio streams from both of those sources playing over the top of each other.

The operation of the terminal when a call is being made will now be described with reference to FIG. 2.

Figure 2:
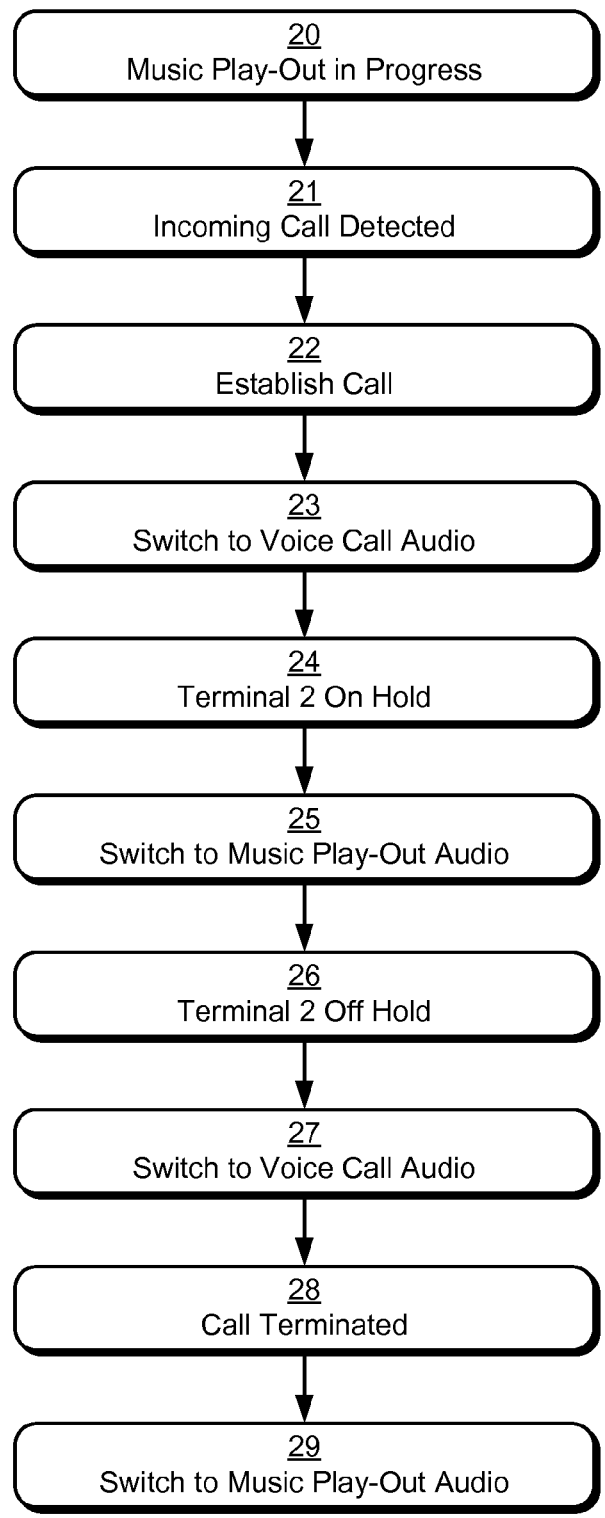
FIG. 2 illustrates steps in handling a call.

At step 20 of FIG. 2, a process that supports voice calls and a process that supports audio play-out are both running on the processor 10. The processor's time is divided between the processes so that both can function satisfactorily. The user is listening to audio from the loudspeaker 14 which is being generated by the play-out process. The user has defined by means of the keypad 15 a playlist comprising one or more audio files, and the play-out process is in the course of playing out that playlist via the loudspeaker. Meanwhile, the voice call process is listening for signals at interface 12 that indicate an attempt to initiate a call.

At step 21 the voice call process detects signalling at interface 12 that indicates an attempt from a counterpart terminal to initiate a call with the terminal 2. In this example, the counterpart terminal is terminal 1. The signalling could be of any suitable protocol, for example analog signalling, DTMF, hook-flash, SIP or H.323. The voice call process participates in the appropriate signalling with the counterpart terminal in order to establish a call.

When the call has been established (step 22) the voice call process causes the audio play-out process to stop passing audio to the loudspeaker. The voice call process then implements the voice call by receiving signals at interface 12 that represent audio from the remote party and reproducing that audio at speaker 14; and by receiving local audio by means of microphone 13 and transmitting signals representing that audio to the other party by means of interface 12. (Step 23).

During the course of the call the other party, i.e. the user of terminal 1, puts the terminal 2 on hold. (Step 24). The fact that terminal 2 is on hold can be detected by terminal 2 in a number of ways which are discussed in more detail below. In response to the determination that terminal 2 is on hold, the voice call process stops passing audio to the loudspeaker 14 and causes the audio play-out process to resume passing audio to the loudspeaker. (Step 25). Preferably the play-out of the user's playlist is resumed from the point at which it was interrupted when the call was established, but other options are feasible, as discussed below.

When the user of terminal 1 takes terminal 2 off hold (step 26), that fact is detected by the voice call process of terminal 2. In response to the determination that terminal 2 is off hold, the voice call process causes the audio play-out process to again stop passing audio to the loudspeaker, and resumes reproducing at the loudspeaker audio received from the remote party. (Step 27).

At some point one of the parties terminates the call. (Step 28). That fact is detected by the voice call process which, in response to that fact, causes the audio play-out process to resume playing out audio to the loudspeaker. (Step 29).

In this way, when the user of the terminal 2 is on hold he hears audio that is to his taste.

In one especially convenient embodiment, the terminal 2 is a computer running an application for IP voice calling and an application for music play-out. The audio source that drives the computer's loudspeaker alternates between the applications in the manner described above.

The fact that the terminal 2 has been placed on hold, or has been taken off hold, may be detected in various ways.

Figure 3:
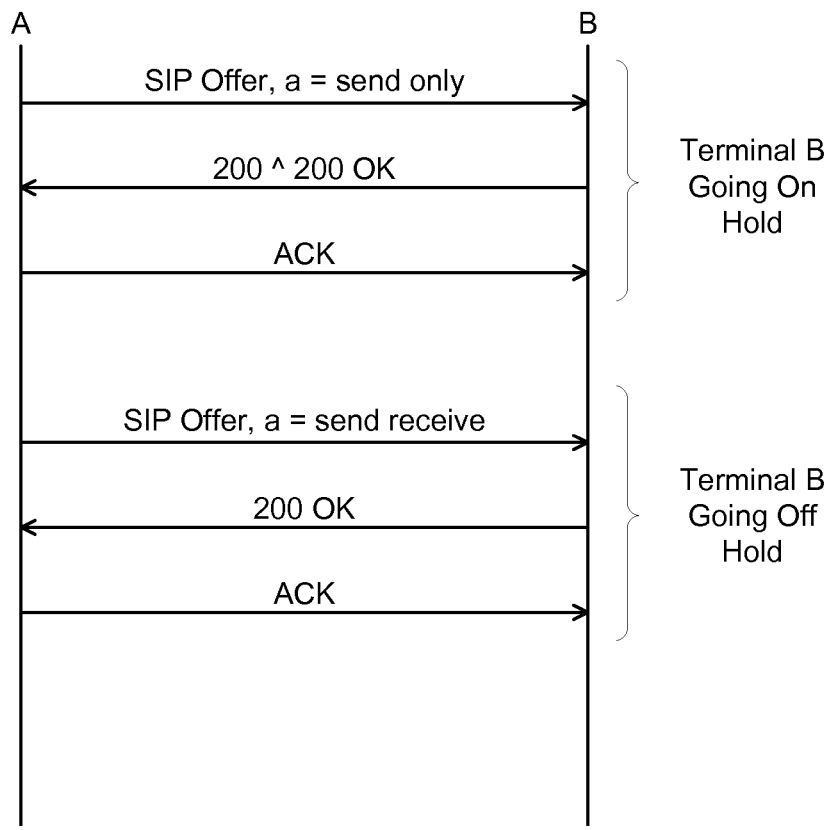
FIG. 3 illustrates SIP signalling for placing a terminal on hold and bringing it off hold.

In some systems, the fact that a terminal is being placed on hold or is being taken off hold is explicitly signalled to the terminal. As an example, FIG. 3 shows SIP protocol signalling in this regard. When two terminals A and B are engaged in a call, terminal A can place terminal B on hold by sending a SIP offer message with a=sendonly. Terminal B returns a 200 OK message and terminal A responds with an ACK message. Once this exchange is complete, terminal B knows that it is on hold. When terminal A wishes to take terminal B off hold, terminal A sends a SIP offer message with a=sendrecv. Terminal B returns a 200 OK message and terminal A responds with an ACK message. Once this exchange is complete, terminal B knows that it is off hold. In this instance, the voice call process can detect that the call is on and off hold in response to the SIP signalling.

In other systems there is no explicit signalling that a terminal is on hold. However, the terminal that is on hold could detect that condition by analysing the audio signal received from the other party on the call. Similarly, when the terminal is taken off hold it could detect that condition by analysing the audio signal received from the other party on the call. In this instance the voice call process can detect that the call is on and off hold in response to the audio processing. The audio processing may rely on various techniques, including detecting repeated elements in the call stream and detecting elements stored in a library of sounds characteristic of a hold situation. The library could be stored on a server or locally to the device that does the processing. The library could comprise audio clips or data defining audio envelopes or signatures, for example defining the characteristics of a particular voice.

It is conceivable that a user may be reluctant to have the terminal use audio processing to detect that a call has been placed on hold, in case it unwontedly interrupts a call. To address this, the terminal could permit the user to manually indicate that the call has been placed on hold, for example by selecting a menu item of a user interface implemented by means of keypad 15 and display 16, and could then automatically detect when it is taken off hold. Other input devices such as microphone 13 or a touch-screen could be used to accept the user input. In this instance the voice call process detects that the call is on hold in response to the user input, and that it is off hold in response to the audio processing, The voice call could be handled by any suitable means. Without limitation, these means include packet-switched voice calling (e.g. IP voice calling), circuit switched analogue voice calling and mobile (e.g. cellular or satellite) voice calling.

In the example above, the audio that is played out is stored locally on the terminal 2. The audio could be obtained from other sources. For example, it could be retrieved from an audio server that is separate from terminal 2 but is at the premises of the user of terminal 2, or it could be retrieved over a publicly accessible network such as the internet from a remote audio server 5. The remote audio server could implement a radio station service (in which the recipient selects a channel and the audio on that channel is selected by a provider) or a music play-out service such as that provided by Spotify (in which the audio in the stream or a property of it is selected by the recipient). Alternatively, the audio could be received by a radio receiver (e.g. an FM receiver) in the terminal 2. In each case, the audio is not received from the terminal 1, and preferably is not received over the logical link that terminal 2 has to terminal 1. The physical source of the replacement audio may also be different from the physical link that terminal 2 has to terminal 1, as (for instance) when the audio is received from an FM radio, from a local music source or from the internet when the call is connected to the terminal 2 by a circuit-switched analogue voice call line. There could be limited overlap of the physical links by which the audio is served and by which terminal 2 is connected to terminal 1, as when the terminals are interconnected over the internet, terminal 1 has a single internet connection to the internet and the audio is received from a server over the internet.

In the example above, the user has defined a playlist and the audio to be played out when a call is on hold is selected from that playlist. The audio to be played out when the call is on hold could be selected in other ways. For example, it could be randomly chosen from all audio stored on the terminal or otherwise accessible to the terminal; it could be chosen from audio that the user has indicated as being favourite, or that the user has indicated as being especially suitable for use when in hold on a call; or it could be downloaded from a specified location.

Preferably the source of the audio is one that has been selected and/or configured prior to the call by means of terminal 2. In that way, it can be supposed that the audio will be to the taste of the user of terminal 2. The source could be selected by the terminal 2 being configured to retrieve audio from it, as would be the case if the terminal 2 has been configured to use a particular audio server or service. That configuration could be stored in memory 11. The source could be configured by the terminal 2 storing in memory 11 settings that indicate to the play-out process which audio from that source is to be played-out, for example by selecting a radio station, a genre of music, a set of music files, a playlist, a favourites list or logic for selecting audio for play-out. Thus, the user of terminal 2 can influence the selection of the audio that is to be played out when the terminal is on hold. That selection can be direct or indirect. It can be direct in the sense that the audio to be played out when the terminal is on hold has been specifically added to a playlist or the like by the user. It can be indirect in the sense that the terminal may select randomly from a group of music previously indicated by the user.

In the example above, the audio was playing out when the call was received. Substitute audio could be provided in the manner described above when a call is on hold irrespective of whether audio was being played out when the call was received.

Either party could originate the call. The call could be a conference call or another non-standard form of call. More generally, the call could be a communication session.

In the example above, the voice call process is responsible for invoking the output of play-out process when the call goes on hold, and for suppressing it when the call comes off hold. The switching between the audio streams could be handled in other ways. For example, there could be a physical switch that selects whether the loudspeaker is to be driven by an audio play-out source or by the voice call source. The play-out source could continue to generate output whilst the call is in progress, but the switch could be altered to select the voice call source when the call is in progress and is not on hold. A management process could be used to select which of the voice call process and the play-out process is to drive the loudspeaker. Instead of separate processes there could be a single process. The terminal could operate entirely in dedicated hardware.

The audio play-out process or its hardware alternative need not be integrated with the terminal 2. For example a mobile phone could play out audio that it receives over a local wired or wireless link to a separate music player. The phone could interrupt the audio when a call is received and resume it when the call is on hold. A similar function could be performed by a third device that integrates audio from both a phone and a music player, provided it is signalled by the phone when the call starts, ends and goes on or off hold.

Similar principles could be applied to video calls. A video call could be interrupted by a separate video stream when the call is on hold. It may be more difficult to detect that the video component of a video call has been interrupted than it is to detect that the audio component of a video call has been interrupted. To simplify processing, a decision on whether a video call has been placed on hold or taken off hold could be dependent solely on the audio component of the video call.

A range of alternative behaviours may be undertaken when a call is placed on hold and/or taken off hold. Without limitation, behaviours that may be undertaken when a call is placed on hold include:
  delivering or rendering a different content stream to that of the call, for example a stream derived from locally-stored data; and/or
  presenting an audible or visual prompt to the user, for example by means of a loudspeaker or display of a user interface.

Without limitation, behaviours that may be undertaken when a call is taken off hold include:
  delivering or rendering the content stream of the call; and/or
  presenting an audible or visual prompt to the user, for example by means of a loudspeaker or display of a user interface.

When the call is on hold, instead of interrupting the call, the local stream could be mixed with the stream from the call and both played out to the user. This could enable the user to indicate to the device when the call has come off hold, or could allow the user to listen to messages indicating his position in a queue. The stream from the call could be filtered before being mixed with the local stream to remove some content therefrom. For example, music in the call stream could be removed so that only voice prompts or announcements are audible in the mixed stream.

The locally generated stream could be silence.

The nature of a hold state on a call or other communication session may depend on the technical nature of the session or the communication between the parties. Placing a call on hold may be interpreted as a switch of the session to non-interactive traffic in at least one direction, in that one party switches from a mode in which it does interact with content received from the other party (the party on hold) to a mode in which it does not interact with content received from the other party (the party on hold). Taking a call off hold may be interpreted as a switch of the session to interactive traffic in at least one direction, in that one party switches from a mode in which it does not interact with content received from the other party (the party on hold) to a mode in which it does interact with content received from the other party (the party on hold).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A communication system comprising:
  a user device having:
    an interface to a network, whereby the user device can be connected to another device on a communication session;
    an output for outputting a communication stream received from the other device as part of the communication session;
    a source of play-out stream independent of the communication session and being determined at the user device; and
    at least one memory that stores configuration settings for the source of play-out stream, the source of play-out stream being responsive to the configuration settings such that content of the play-out stream that is directed from the source of play-out stream to the output when the user device has been placed on hold in the communication session is dependent on the configuration settings;
  and
  a communication controller for managing the communication session for the user device, the communication controller being configured to:
    when it detects that the user device has been placed on hold in the communication session, cause play-out stream from the source of play-out stream to be directed to the output; and
    when it detects that the user device has been taken off hold in the communication session, cause communication stream from the communication session to be directed to the output.

2. A communication system as claimed in claim 1, wherein the user device is configured to implement a user interface whereby the configuration settings can be set by a user local to the user device.

3. A communication system as claimed in claim 1, wherein the source of play-out stream is responsive to the configuration settings in such a way as to decode one or more files specified by the configuration settings so as to form the stream that is directed to the output when the user device has been placed on hold in a communication session.

4. A communication system as claimed in claim 3, wherein the one or more files are stored in memory of the user device.

5. A communication system as claimed in claim 1, wherein the source of play-out stream is responsive to the configuration settings in such a way as to retrieve the stream that is directed to the output when the user device has been placed on hold in a communication session from a location specified by the configuration settings.

6. A communication system as claimed in claim 1, wherein the communication controller is configured to detect that the user device has been placed on hold in a communication session by virtue of signaling messages associated with the communication session.

7. A communication system as claimed in claim 1, wherein the communication controller is configured to detect that the user device has been placed on hold in a communication session by virtue of processing of the communication stream received from the other device.

8. A communication system as claimed in claim 7, wherein the communication controller is configured to detect that the user device has been placed on hold in a communication session by virtue of audio processing of the communication stream received from the other device.

9. A communication system as claimed in claim 1, wherein the communication controller is configured to detect that the user device has been placed on hold in a communication session by virtue of input to the user device.

10. A communication system as claimed in claim 1, wherein the communication controller is configured to detect that the user device has been placed on hold in a communication session by virtue of input provided to the user device and designating a current state of the communication stream as being associated with a hold state.

11. A communication system as claimed in claim 1, wherein the communication controller is configured to detect that the user device has been taken off hold in a communication session by virtue of signaling messages associated with the communication session.

12. A communication system as claimed in claim 1, wherein the communication controller is configured to detect that the user device has been taken off hold in a communication session by virtue of processing of the communication stream received from the other device on the communication session.

13. A communication system as claimed in claim 1, wherein the user device comprises the communication controller.

14. A system comprising:
   at least one memory device storing software for execution in a communication system having a user device comprising an interface to a network, whereby the user device can be connected to another device on a communication session;
   an output for outputting a communication stream received from the other device as part of a voice call;
   a source of play-out stream independent of the communication session and being determined at the user device, the at least one memory storing configuration settings for the source of play-out stream such that content of the play-out stream that is directed from the source of play-out stream to the output when the user device has been placed on hold in the communication session is dependent on the configuration settings; and
   a communication controller for managing the communication session for the user device; the software being executable to cause the communication controller to:
      when it detects that the user device has been placed on hold in the communication session, direct the play-out stream from the source of the play-out stream to the output; and
      when it detects that the user device has been taken off hold in the communication session, direct communication stream from the communication session to the output.

15. A system as recited in claim 14, wherein the source of play-out stream is a file stored on the at least one memory device.

16. A system as recited in claim 14, wherein the source of play-out stream is a file retrieved from a network resource by the communication controller.

17. A computer-implemented method comprising:
   detecting that a user device is placed on hold during a communication session;
   retrieving, responsive to said detecting and from a source local to the user device, configuration settings for a source of play-out stream that is determined locally at the user device;
   retrieving content from the source of play-out stream determined locally at the user device responsive to said retrieving and dependent on the configuration settings, the content comprising at least one of audio content or video content;
   causing the content to be output via the user device while the user device is on hold; and
   causing a communication stream to be output as part of the communication session when it is detected that the user device is taken off hold.

18. The computer-implemented method of claim 17, wherein said retrieving comprises connecting to a content service that streams content from a network resource.

19. The computer-implemented method of claim 17, wherein said retrieving comprises retrieving the content from a content playlist that is generated locally on the user device.

20. The computer-implemented method of claim 17, wherein said causing the content to be output comprises outputting at least one content file that is stored locally on the user device.

* * * * *